Dec. 29, 1959　　　H. BARTHOLOMÄ ET AL　　　2,918,785
ELASTIC LINK STRAPS
Filed Oct. 30, 1956　　　　　　　　　　　　　　　2 Sheets-Sheet 1
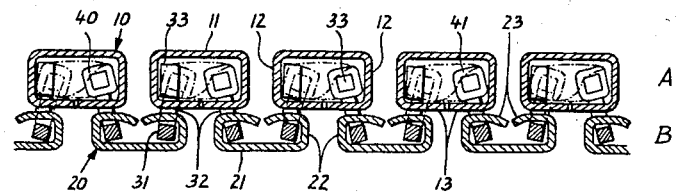
Fig.1
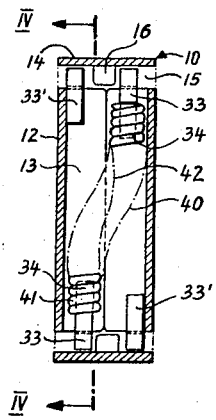
Fig.2　　Fig.3
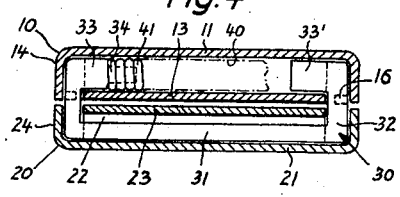
Fig.4　　Fig.5
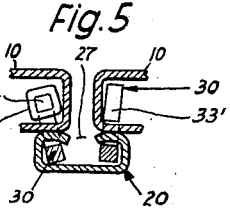
Fig.6　　Fig.7
Fig.8
INVENTOR.
HELWIG BARTHOLOMÄ AND
WERNER BARTHOLOMÄ
BY Michael S. Striker Dec. 29, 1959  H. BARTHOLOMÄ ET AL  2,918,785
ELASTIC LINK STRAPS
Filed Oct. 30, 1956  2 Sheets-Sheet 2

INVENTOR.
HELWIG BARTHOLOMÄ AND
WERNER BARTHOLOMÄ
BY Michael S. Striker

United States Patent Office 2,918,785
Patented Dec. 29, 1959

2,918,785

ELASTIC LINK STRAPS

Helwig Bartholomä and Werner Bartholomä, Huchenfeld, Kreis Pforzheim, Germany, assignors to Rodi & Wienenberger Aktiengesellschaft, Pforzheim, Germany Application October 30, 1956, Serial No. 619,341

Claims priority, application Germany January 28, 1956

6 Claims. (Cl. 59—79)

The present invention relates to new improvements in elastic link straps for ornamental or utilitarian purposes, and especially in watch bracelets. More particularly, the invention relates to improvements in that type of strap which consists of two layers of hollow links which are staggered relative to each other by the width of one-half link, and wherein each link of one layer is pivotally connected with two links of the other layer by means of two substantially rectangular connecting brackets, the short stub ends of which project into the links of one layer and are connected with torsion coil springs disposed within these links in such a manner that the springs will be tensioned when the strap is being expanded. These coil springs terminate at each end in an arm, and the coiled portions of the two adjacent springs are in each case combined with each other by being fitted upon an intermediate member, while their adjacent arms are supported within the respective link so as to prevent them from turning. The two outer arms of the springs either extend into the links of the other layer so as to form connecting members thereto, and their angular ends therein are mounted in a sleeve connecting the same, or the coiled portions of both springs are fitted on the opposite stub arms of an open connecting bracket, the main connecting arm of which extends parallel to the stub arms and is mounted within the link of the other layer, while the free spring arms engage under tension against the lateral arms of the bracket which then serve as connecting members. Furthermore, for the passage of the connecting members from the links of one layer to those of the other layer, the links of one layer are provided with slots only in the bottom thereof, while those of the other layer also have such slots in their longitudinal side walls, but only along a portion of their height. These slots only permit a limited pivotal movement of the connecting members and therefore only a limited expansion of the strap.

It is an object of the present invention to provide an elastic link strap of the general type as above described, in which, however, the mentioned disadvantages thereof are avoided, thus permitting the strap to be expanded to more than twice its contracted length.

Another object of the invention is to provide an elastic link strap in which the springs are of a more simple and inexpensive design, and are more easily assembled in the links than in a strap of this type as previously designed.

According to the present invention, only one of the two stub arms of each connecting bracket which project into the link containing the spring is nonrotatably connected with the spring, while the opposite stub of the bracket is freely rotatable within the same link. These springs may consist entirely of torsion coil springs, at least one end of which is shaped so as to be nonrotatably fitted upon the square-shaped stub, and which, after being tensioned by being turned about its axis, is fitted upon the square-shaped stub end of a connecting bracket in a link of one layer, while the other arm of such bracket is mounted in a link of the other layer. The coil spring may also be shaped so as to be nonrotatably mounted at both ends on square-shaped stubs, and these spring ends which are turned relative to each other to tension the spring, which then extends in a slightly S-shaped curve, are fitted upon one stub end of each of the two connecting brackets entering into the link containing the spring and connecting such link with the two links of the other layer.

According to another embodiment of the invention, one square-shaped stub end of each bracket may be fitted into one end of a coil spring, the other end of which is nonrotatably mounted within the link itself, while according to still another embodiment of the invention the center of each coil spring may be clamped tightly within the link, and the two ends thereof, after the two halves of the spring have been tensioned by being turned in the same direction, are then mounted on the two opposite stubs of the same connecting bracket.

Each spring may also consist of a leaf spring or an assembly of such springs which, after being turned about its axis to tension the spring, is nonrotatably connected to the stub end of one connecting bracket in one link which connects such link with one of the other layer. Such spring may also be integral with such connecting bracket or constitute the bracket itself.

The apertures provided in the links for the passage of the connecting brackets from those in one layer to those in the other layer are provided according to the invention either in such a manner that the side walls and the bottom walls of the links are cut back to such an extent from each of the end walls thereof which extend along the longitudinal sides of the strap so that immediately behind each end wall an aperture will thus be formed which is slightly wider than the thickness of the side arms of the bracket passing therethrough. If, however, these apertures for the passage of the side arms of the connecting brackets are to be disposed further inwardly, the downwardly and inwardly bent side and bottom walls are provided along their entire width with notches extending in the longitudinal direction of the strap. If desired, the links of the lower layer may also be provided with apertures of the first-mentioned kind and those of the upper layer with those of the last-mentioned kind. This may be desirable if the upper links are of greater width than the lower links transversely to the direction of expansion of the strap. In that case, those parts of the upper links which extend beyond the lower links may be tapered, angularly inclined, or rounded off toward the longitudinal outer edges of the strap. The links of the upper layer may also be of greater width than the lower links in the longitudinal direction of the strap so that the latter will be spaced from each other when the strap is contracted. Also, all the links of the layer which does not contain any springs are preferably designed so that the wall thereof facing toward the other layer and retaining the connecting brackets in these links are separated by a gap of such a width as to permit the pivotable arms of the brackets to be hooked into these links or to be unhooked therefrom so that the strap may be lengthened or shortened at any desired point.

Apart from the fact that the springs, as well as their assembly are much more simple than those of the straps of this type as previously designed, the new strap has the further important advantage that each connecting member thereof may be pivoted about an angle of 90° and even more degrees and thus permit the links of the two layers to pivot from their superimposed position when at least the upper links are in engagement with each other, to a position in which they are adjacent to each other and substantially within the same plane. Thus, depending upon the width of the upper and lower links relative to each other, the new elastic strap will allow an expansion of 100 to 130%. A further advantage of the new strap over those of prior design resides in the fact that the links may be very easily and inexpensively produced and each link may consist of only one small plate which may be easily stamped to its desired shape. The new structure of the elastic link strap also affords the possibility that, by merely leaving a gap between the wall portions of the links of one layer which are facing toward the other layer, the connecting brackets may be hooked into or unhooked from the links within a few seconds and without any tools in order to increase or reduce the length of the strap by the addition or removal of one or more links.

Further objects, features, and advantages of the present invention will become apparent from the following detailed description thereof, particularly when read with reference to the accompanying drawings, in which—

Fig. 1 shows a vertical longitudinal cross section through a first embodiment of the elastic link strap according to the invention with upper and lower links of substantially equal width, as seen in a partly expanded position;

Fig. 2 shows a horizontal cross section taken closely underneath the upper wall of an upper link according to Fig. 1 and showing the inventive manner of mounting the spring;

Fig. 3 shows a similar cross section through a lower link and the connecting brackets therein, taken closely underneath the upper wall portions of such link;

Fig. 4 shows a cross section taken along line IV—IV of Fig. 2;

Fig. 5 shows a vertical longitudinal cross section through a modification according to the invention in which the links and connecting brackets are adapted to be disconnected from each other;

Fig. 6 is a front view of a connecting bracket according to the invention;

Fig. 7 is an end view thereof;

Fig. 8 is a top view thereof;

Fig. 16 shows a cross section similar to Fig. 4 through another modified elastic link strap in which the upper links are of greater length than the lower links; while

Figure 9:
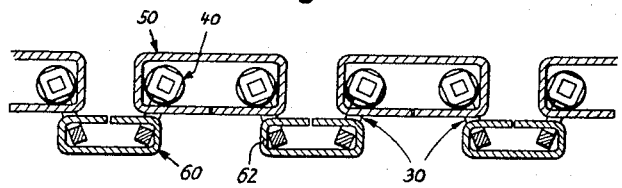
Fig. 9 shows a vertical cross section through a second embodiment of the elastic link strap according to the invention, taken in the longitudinal direction of the strap, with upper and lower links of different width.

Referring to the drawings, and first particularly to Figs. 1 to 4, the elastic link strap according to the invention consists of a layer A of upper links 10 and a layer B of lower links 20 which normally extend parallel to each other within each layer and between both layers. Both types of links 10 and 20 are of substantially rectangular shape and form hollow casings with a continous lower or arm-engaging wall 21 on each lower link 20. These walls 11 and 21, respectively, merge in side walls 12 and 22, respectively, which extend transversely to the longitudinal direction of the strap and at substantially right angles to walls 11 and 21, respectively. Side walls 12 of the upper links, in turn, terminate in lower wall portions 13, while side walls 22 terminate in upper wall portions 23. These wall portions 13 and 23 are again bent at substantially right angles to side walls 12 and 22, respectively, and face toward each other at the inside of the strap. The upper, ornamental wall 11 and the lower, arm-engaging wall 21 are, respectively, integral with pairs of end walls 14 and 24, which are bent at substantially right angles thereto and together form the longitudinal sides of the strap. Side walls 12 and 22 are made at each end slightly shorter than walls 11 and 21, respectively, so as to form a slot 15 and 25, respectively, between each of their ends and end walls 14 and 24, respectively. Furthermore, the upper links 10 are offset or staggered relative to the lower links 20 by the width of one-half link in the longitudinal direction of the strap, and the superimposed parts of each upper link 10 and lower link 20 are pivotally connected with each other by a rectangular bracket 30, as shown particularly in Figs. 6 to 8. Each connecting bracket 30 consists of a longer straight arm 31 which is adapted to be disposed within one-half of a lower link 20, as shown particularly in Fig. 4, and a pair of short arms 32 which are adapted to extend from the lower link 20 to the superimposed part of the upper link 10 through the respective slots 25 and 15 of these links, and the short inwardly bent stub ends 33 of which engage into such upper link 10. The width of these stubs 33, as seen in a vertical direction, substantially corresponds to the inner height of upper links 10. At least one of stubs 33 and 33' terminates in a square-shaped end portion 34 upon which the hollow square-shaped end 41 of a coil spring 40 is fitted so as to be non-rotatably secured thereto. Coil spring 40 may, however, also be of a square cross-sectional shape throughout its length.

In the embodiment of the invention as shown in Fig. 2, coil spring 40 has a similar square-shaped portion 41 at each end and extends in an S-shaped curve and twisted in a manner as indicated by the dot-and-dash line 42 from the square-shaped end portion 34 on stub 33 of one bracket 30 to the diagonally opposite square-shaped end portion 34 on stub 33 of the other bracket 30 in the same upper link 10. Both brackets 30 are thus pivotally mounted in both the upper and lower links, and when being pivoted by the expansion of the strap relative to each other, each spring 40 will be torsionally tensioned, while the lateral arms 32 of brackets 30 will then slide within slots 15 and 25 of the upper and lower links 10 and 20, respectively, thereby partly releasing the tension of spring 40 until such pivotal movement will finally come to an end when bracket arms 32 engage against stop members 16 which are bent inwardly from end walls 14 of upper links 10 into the plane of the lower wall portions 13 thereof. As shown particularly in Figs. 7 and 8, the other bracket arm 32 with the free stub 33' is bent slightly outwardly to the extent of the wire thickness of spring 40 relative to the opposite arm 32 and stub 33 with the square portion 34 thereon. This permits spring 40 which is mounted on square portion 34, as well as stub 33' which is devoid of a square-shaped end to abut against the upper wall 11 of the upper link so that the latter will be prevented from turning to an oblique position relative to the lower link. The tension of springs 40 will then tend to contract the strap. When the strap is being expanded, the lateral arms 31 of two adjacent brackets 30 pivot outwardly relative to each other about arms 31 in the lower link casing 20, while stubs 33 and 33' of such two brackets turn within the upper link casings 20 in opposite directions to each other. Such turning movement automatically tensions springs 40 so that the strap when released will again contract. When the strap is being expanded, slots 15 and 25 in the side walls 12 and 22 of the upper and lower links permit the two arms 32 of brackets 30 to pivot behind end walls 14 and 24, respectively of the links until they extend parallel to the upper and lower walls 11, 13 and 21, 23 thereof, in which case the upper and lower links 10 and 20 will be at substantially the same level with each other and all the parts 10, 20, and 30 which are movable relative to each other will be in a fully stretched position. Thus, when the upper and lower links 10 and 20 are of equal width, the degree of expansion of the strap between the fully contracted position and the fully expanded position thereof will, in view of the pivotal movement of brackets 30 be over 100%.

If an elastic strap as above described should be designed so as to be of adjustable length by the removal of one or more links or the insertion of additional links, a slot 27 may be provided between the two upper wall portions 23 of the lower links 20, as shown in Fig. 5, which slot is made of such a width that arm 31 of bracket 30 may be hooked into or unhooked from the lower link 20 through such slot. Thus, one or more pairs of upper and lower links 10 and 20 may be easily removed from or inserted into the strap, and the strap may thus be shortened or lengthened to adapt it to the size of the arm of the respective wearer. Bracket arms 31 cannot become unhooked unintentionally since the constantly existing tension of springs 40 presses these arm against side walls 22 of the lower links 20. Thus, although bracket arms 31 may be unhooked very easily, this can only be done intentionally, and only by pushing them inwardly toward slot 27 against the force of springs 40.

The strap may be designed so that either the layer of links A which contain the springs or the other layer of links B forms the outer ornamental side of the strap. This applies likewise to the other embodiments of the invention as subsequently described.

The modified embodiment of the invention as shown in Fig. 9 differs from that previously described and shown in Figs. 1 to 8 merely by the fact that the upper links 50 have a greater width than the lower links 60. Consequently, when the strap is contracted and the upper links 50 engage each other, side walls 62 of the adjacent lower links 60 will be spaced from each other by a gap so as to permit air to pass toward the arm-engaging side of the strap to ventilate and cool the arm, and to prevent an accumulation of perspiration and also the skin or hairs on the arm of the wearer from being caught between the adjacent lower links.

If the lower links 60 are made of a width which is, for example, one-third narrower than that of the upper links 50, the degree of expansion of the strap will also be smaller and amount to about 66%. Such expansion is, however, still sufficient to permit the strap to be easily slipped on or off the arm and over the hand. The links of such a strap which are made of a single piece of material and may be provided with smoothly rounded edges will also have no tendency to scratch the hand of the wearer when the strap is being slipped over the hand and wrist.

Figure 10:
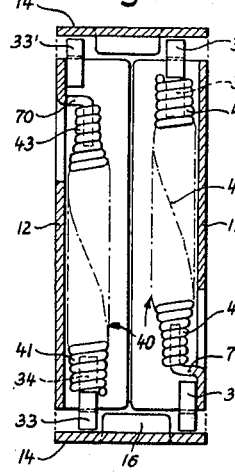
Fig. 10 shows a cross section similar to Fig. 2 through a modification of the resilient connection between the upper and lower links.
Figure 12:
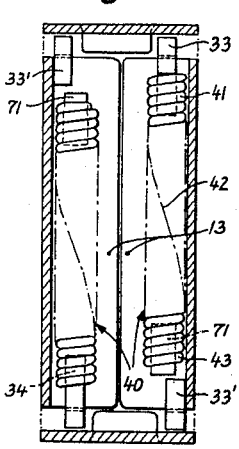
Fig. 12 shows a cross section similar to Fig. 2 through another modification of the resilient link connection.
Figure 14:
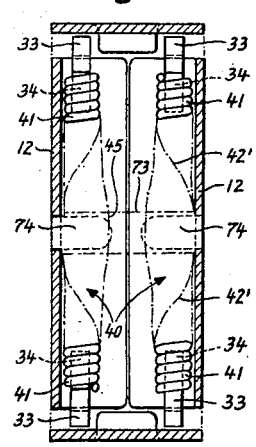
Fig. 14 shows a cross section similar to Fig. 3 through a further modification of the resilient link connection.
Figure 11:
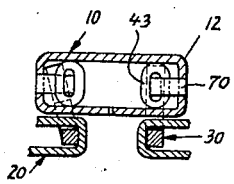
Fig. 11 shows a cross section similar to Fig. 5 through the modification according to Fig. 10.
Figure 13:
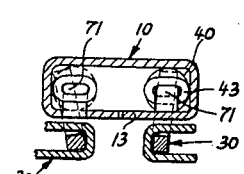
Fig. 13 shows a cross section similar to Fig. 5 through the modification according to Fig. 12.
Figure 15:
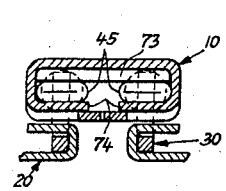
Fig. 15 shows a cross section similar to Fig. 5 through the modification according to Fig. 14.

Figs. 10 to 15 illustrate several modifications in the arrangement of the coil springs, the other parts of the strap being substantially the same as shown in Figs. 1 to 8 or Fig. 9. Therefore, the same reference numerals have been applied in Figs. 10 to 15 for all those parts which are substantially identical with those shown in Figs. 1 to 9. Each upper link 10 contains two coil springs 40. In the embodiments according to Figs. 10 to 13, the end 43 of each of these two springs 40 which faces in the opposite direction from the square-shaped bracket portion 34 is mounted on a supporting bracket which is stamped out of link 40 and is then bent over inwardly. For such mounting, the respective spring end 43 is made of a hollow, substantially square-shaped cross section in accordance with the rectangular cross section of the supporting bracket by being pressed flat. In the embodiment as shown in Figs. 10 and 11, this supporting bracket 70 is stamped out of the side wall 12 of the upper link 10, while in the embodiment according to Figs. 12 and 13, a similar supporting bracket 71 is stamped out of the lower wall portion 13 of the upper link 10. In both embodiments, the supporting brackets 70 and 71 are then bent over so that their free ends face toward the square stub 34 of brackets 30. Finally, in the embodiment according to Figs. 14 and 15, each of the two springs 40 is provided with two hollow square-shaped ends 41 and slipped upon corresponding square-shaped ends 34 on both stubs 33 of brackets 30. The central parts 45 of these springs 40 are pressed flat and are nonrotatably secured between member 73, which is inserted between the upper wall 11 of the upper link and such flattened central part 45 of both springs 40, and a pair of supporting lugs 74 which are stamped out of side walls 12 of the link and bent over and against the flattened central part 45 of springs 40 so as to clamp them securely at that point. Both halves of each spring 40 are then twisted as indicated by dot-and-dash lines 42' and thus torsionally tensioned so as to pivot the respective bracket arm 31 which is connected thereto in a direction toward the upper link 10 and the other bracket arm 31, and thereby to draw the lower links 20 toward each other.

Figure 16:
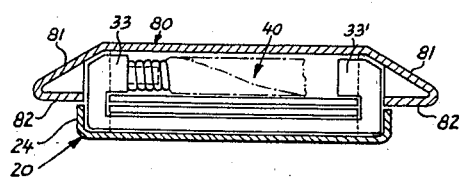

In the embodiment of the invention as shown in Fig. 16, the upper links 80 are provided with longer end walls 81 which are tapered outwardly and their free ends 82 then bent inwardly so as to form a rooflike structure overhanging the lower link 20. Such downward slope of the upper links 80 toward their outer edges produces the optical impression of a very small thickness of the strap and improves the appearance thereof.

Figure 17:
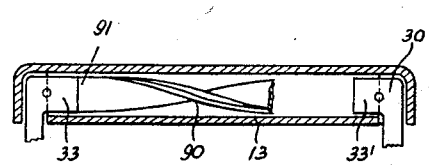
Fig. 17 shows a cross section through an upper link of the elastic strap according to the invention, in which a leaf spring is applied in place of a coil spring as in the previous embodiments.

The embodiment of the invention as shown in Fig. 17 differs from the embodiments previously described by the fact that the torsion spring for pivoting brackets 30 consists of one or more leaf springs 90. Bracket 30 may thus, for example, consist of two layers which may be combined by being made of a single strip of metal which is folded over along the lower edge of arm 31 and by the two layers thus formed then being riveted to stubs 33' of brackets 30. One end 91 of the spring assembly 90 may then also be riveted to one stub 33 or between the two layers thereof, while the other end (not shown) after the spring is twisted to give it the required tension, is nonrotatably secured to one diagonally opposite stub of the other bracket within the same link. Naturally, the spring assembly 90 and its supporting means, and its connection to brackets 30 may also be designed in a manner analogous to that shown in the embodiments according to Figs. 10 and 11 or 14 and 15, respectively.

While the invention has been described in detail with reference to certain now preferred examples and embodiments thereof, it will be understood by those skilled in the art that various changes and modifications may be made without departing from the spirit and scope of the invention as defined in the appended claims.

Having thus described the invention, what is claimed as new is:

1. An elastic link strap comprising a plurality of links extending transversely to the longitudinal direction of the strap and in the contracted position of said strap forming two layers of links superimposed upon and substantially in engagement with each other, the links in one layer then being staggered relative to the links in the other layer in the longitudinal direction of the strap by the width of one-half link, a pair of substantially rectangular connecting brackets connecting each link of one layer with two adjacent links of the other layer, each of said brackets having a pair of short side arms, an arm connecting said side arms at one end thereof and pivotally mounted in one link of the first layer, and a short arm stub at the other end of each of said side arms and directed toward each other, said stubs extending into a link of the second layer and being pivotally mounted therein, and a torsion spring in each link of said second layer, one end of said spring being nonrotatably secured to one stub of one bracket and the other end to the diagonally opposite stub of the other bracket within the same link, the other two stubs of said two brackets being freely pivotable within said link, said spring being initially tensioned by its two ends being turned relatively to one another about the axis of said spring and extending in a substantially S-shaped curve from one stub of one bracket to the diagonally opposite stub of the other bracket, whereby when the strap is expanded said two brackets in each link will be pivoted in opposite directions and thereby further tension said spring.

2. An elastic link strap as defined in claim 1, wherein each of two diagonally opposite stubs of the two brackets within each link of said second layer has a square-shaped end portion, said torsion springs being coil springs and each having hollow square-shaped ends adapted to fit non-rotatably upon said square end portions of said two stubs.

3. An elastic link strap as defined in claim 1, wherein said torsion springs are leaf springs, each of said springs being initially tensioned by its two ends being turned relative to each other about the axis of said spring and extending in a substantially S-shaped curve from one stub of one bracket to one diagonally opposite stub of the other bracket within the same link and being secured at its two ends to said diagonally opposite stubs.

4. An elastic link strap as defined in claim 1, wherein the inner wall of the links of one layer is centrally split so as to form a gap of a width sufficient to permit the main bracket arm connecting said side arms to pass therethrough and thus to hook said bracket into said link and to unhook it therefrom.

5. An elastic link strap comprising a plurality of links extending transversely to the longitudinal direction of the strap and forming two superimposed layers of links, the links of said layers being staggered relative to each other in longitudinal direction of the strap, each of said links having a substantially tubular portion with openings in the end regions thereof; a set of pairs of substantially C-shaped connecting brackets, each pair of connecting brackets connecting one link of one layer with two adjacent links of the other layer, each of said brackets having a main portion extending through and being turnably mounted in said tubular portion of a link of one layer, a pair of leg portions extending from said main portion, and a pair of stubs respectively projecting from said leg portions and into the openings of the tubular portion of a link of the other layer and being turnable in said tubular portion; and at least one spring mounted in said tubular portion of each link of said other layer, one end of each spring being non-rotatably connected to a stub located at one end of the respective tubular portion and the other end of each spring being non-rotatably connected to one stub located in the same tubular portion at the other end of the respective tubular portion, the two stubs connected by each spring being respectively part of one and part of another of two brackets forming a pair of brackets, said stubs of said brackets being arranged in two rows respectively located at opposite ends of said tubular portions of said other layer, alternate stubs in each of said rows being respectively connected to said springs and freely turnable in said tubular portions of said links of said other layer whereby said links are uniformly spring-tensioned and the tubular portions of the links of at least one of said layers abut each other in the contracted position of the strap while the strap is expansible to a position in which said links form a single layer.

6. An elastic link strap comprising a plurality of links extending transversely to the longitudinal direction of the strap and forming two superimposed layers of links, the links of said layers being staggered relative to each other in longitudinal direction of the strap, each of said links having a substantially tubular portion with openings in the end regions thereof bounded by edge portions; a set of pairs of substantially C-shaped connecting brackets, each pair of connecting brackets connecting one link of one layer with two adjacent links of the other layer, each of said brackets having a main portion extending through and being turnably mounted in said tubular portion of a link of one layer, a pair of leg portions extending from said main portion and being located outside of and opposite said edge portions of said tubular portion, and a pair of stubs respectively projecting from said leg portions and into the openings of the tubular portion of a link of the other layer and being turnable in said tubular portion; and at least one prestressed torsion spring mounted in said tubular portion of each link of said other layer, one end of each spring being non-rotatably connected to a stub located at one end of the respective tubular portion and the other end of each spring being non-rotatably connected to one stub located in the same tubular portion at the other end of the respective tubular portion, the two stubs connected by each spring being respectively part of one and part of another of two brackets forming a pair of brackets, said stubs of said brackets being arranged in two rows respectively located at opposite ends of said tubular portions of said other layer, alternate stubs in each of said rows being respectively connected to said springs and freely turnable in said tubular portions of said links of said other layer whereby said links are uniformly spring-tensioned and the tubular portions of the links of at least one of said layers abut each other in the contracted position of the strap while the strap is expansible to a position in which said links form a single layer.

References Cited in the file of this patent

UNITED STATES PATENTS

| | | |
|---|---|---|
| 147,139 | Kaufman | Feb. 3, 1874 |
| 265,044 | Engleman | Sept. 26, 1882 |
| 881,925 | Holbrook | Mar. 17, 1908 |
| 914,533 | Thornton | Mar. 9, 1909 |
| 2,236,820 | Greenberg | Apr. 1, 1941 |
| 2,733,476 | Eck | Feb. 7, 1956 |
| 2,765,108 | Doerwald | Oct. 2, 1956 |
| 2,799,135 | Dolansky | July 16, 1957 |

FOREIGN PATENTS

| | | |
|---|---|---|
| 788,110 | France | July 22, 1935 |
| 251,199 | Switzerland | Aug. 2, 1948 |
| 945,982 | France | May 19, 1949 |
| 164,499 | Australia | Aug. 8, 1955 |
| 932,867 | Germany | Sept. 12, 1955 |
| 527,990 | Canada | July 17, 1956 |